United States Patent
Leatham et al.

(10) Patent No.: US 6,370,383 B1
(45) Date of Patent: Apr. 9, 2002

(54) ADAPTIVE POWER LEVEL TIERED CELLULAR MOBILE COMMUNICATIONS SYSTEMS

(75) Inventors: Marcus C. Leatham, The Colony; Regena L. Richardson, Sachse; Srinivas Eswara, Carrollton, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/395,662

(22) Filed: Sep. 14, 1999

(51) Int. Cl.[7] ................................................. H04Q 7/36
(52) U.S. Cl. ..................... 455/446; 455/422; 455/453
(58) Field of Search ................................ 455/446, 447, 455/449, 450, 451, 452, 453, 422, 63

(56) References Cited

U.S. PATENT DOCUMENTS 4,435,840 A * 3/1984 Kojima et al. .............. 455/422
5,499,395 A * 3/1996 Doi et al. .................... 455/422

* cited by examiner

*Primary Examiner*—Lee Nguyen
(74) *Attorney, Agent, or Firm*—Haynes and Boone, LLP

(57) ABSTRACT

An adaptive power tiered cell includes inner and outer tiers. Each one of a plurality of communication channels for servicing mobile terminals operating within the cell is assigned to either the inner tier or the outer tier. When a switch of one of the channels assigned to serve mobile terminals operating in a first one of the inner and outer tiers to serving mobile terminals operating in the other one of the first and second tiers is detected, the inner at tier is re-sized such that a ratio of the area of the first tier to the area of the cell matches a ratio of the number of channels serving mobile terminals operating in the inner tier to the number of channels serving mobile terminals operating in the cell. To re-size the inner tier such that a ratio of the area of the inner tier to the area of the cell matches a ratio of the number of channels serving mobile terminals operating in the inner tier to the number of channels serving mobile terminals operating in the cell, a power level threshold value which defines an outer peripheral edge of the inner tier is adjusted.

23 Claims, 2 Drawing Sheets

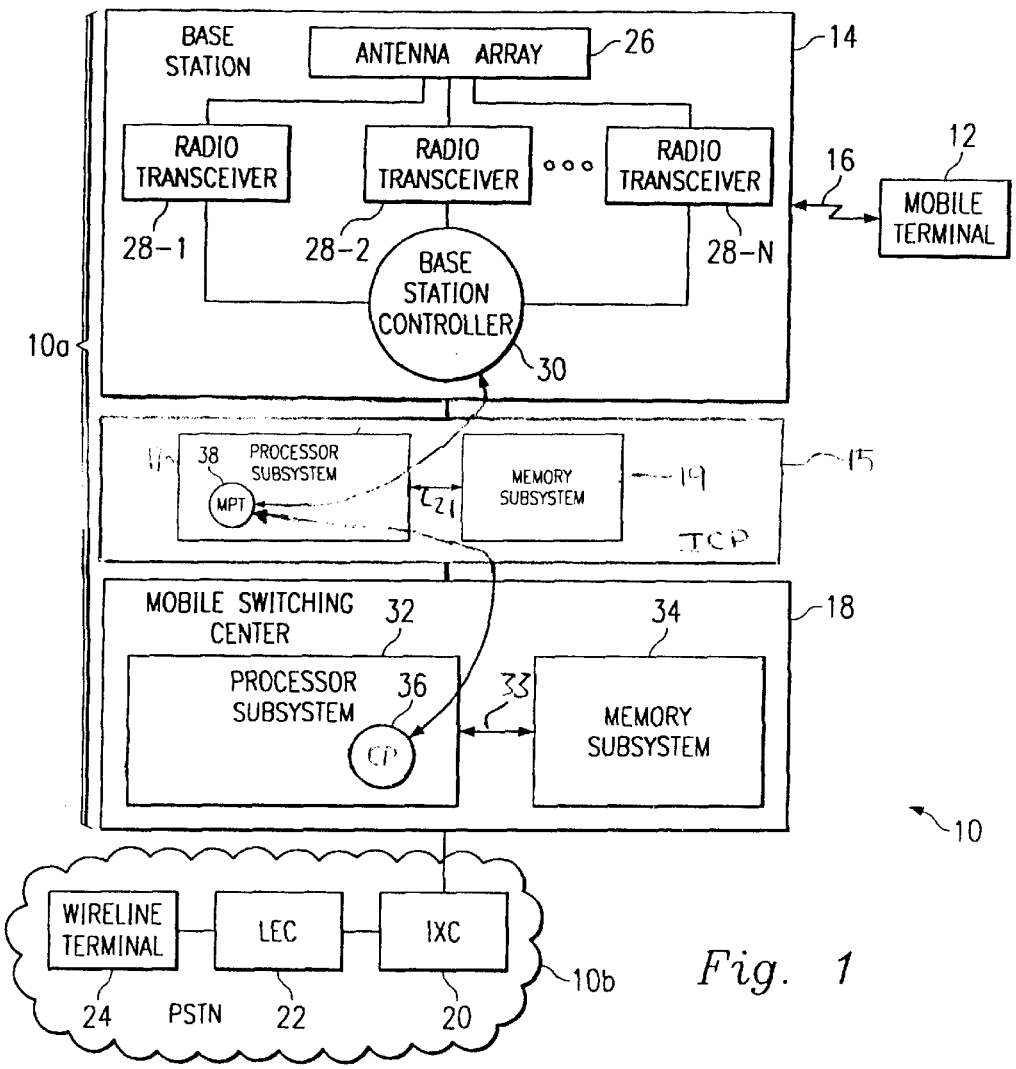
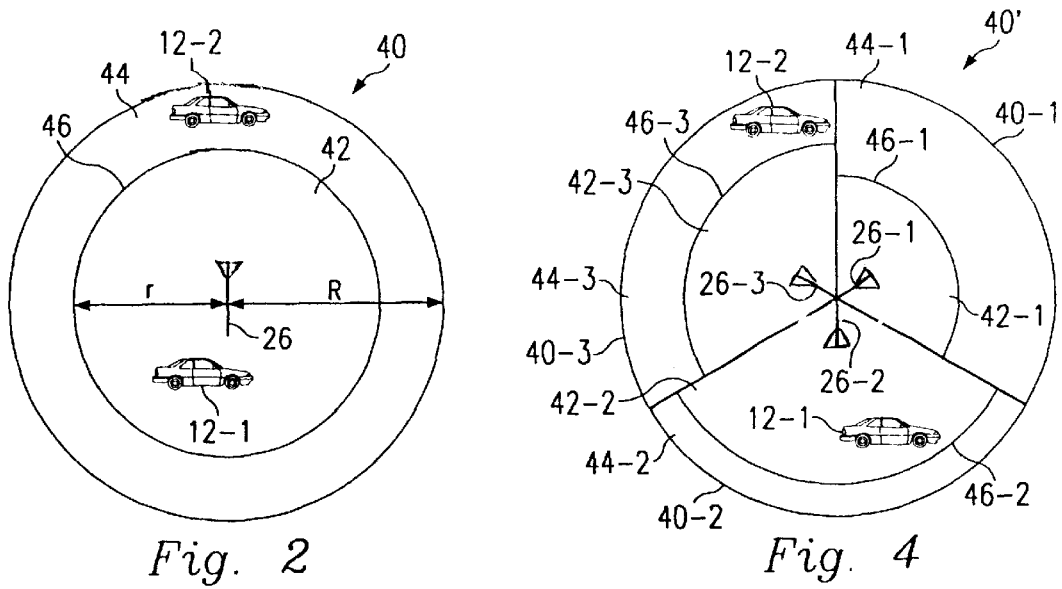
Fig. 1
Fig. 2
Fig. 4

ADAPTIVE POWER LEVEL TIERED CELLULAR MOBILE COMMUNICATIONS SYSTEMS

TECHNICAL FIELD

The invention relates generally to cellular mobile communication systems and, more particularly, to a cellular mobile communication system capable of dynamically adapting a power level tiered cell based upon operating conditions within the cell.

BACKGROUND OF THE INVENTION

A cellular mobile communications system uses a large number of low-power wireless transmitters to create "cells"—the basic geographic service area of a wireless communication system. As mobile users travel from cell to cell within a system, their conversations are "handed off" between cells in order to maintain seamless service. The size of cells tends to vary, depending on factors such as subscriber density, demand for services and terrain within a particular region. Typically, rural areas are served by one large cell which operates at a high power level while urban areas are served by many smaller cells, each of which operates at a lower power level.

Because of the limited number of radio channel frequencies available for wireless communications, cellular systems have adopted the concept of "frequency reuse." The concept of frequency reuse is based upon assigning to each cell a selected group of radio channels for use within a small geographic area. More specifically, each cell is assigned a group of channels which are completely different from the groups of channels assigned to those neighboring cells for which interference between users is possible. The same group of frequencies is then reused in other cells that are far enough away such that interference between users is unlikely. As a service area becomes full of users, a cell is often split into a number of smaller cells.

As demand for wireless communication services grows, the size of cells tends to shrink. As a result, in heavy traffic areas, two users assigned to separate cells but transmitting at the same frequency may be relatively close to each other. In such conditions, interference between the users becomes increasingly likely. Thus, in order to both reduce interference between users of cellular mobile communication systems and to permit more users onto the system, there have been continuing efforts to reduce the amount of RF power needed to maintain contact between a mobile telephone and a base station. One such effort has involved the development of cell tiering.

Cell tiering involves the splitting of a cell in a cellular mobile communication system into an inner tier and an outer tier. Power levels used by the mobile terminals and base station radio transceivers assigned to the inner tier is less than the power levels used by the mobile terminals and base station radio transceivers assigned to the outer tier. Separating the inner and outer tiers is a tier boundary hereafter referred to as a mobile proximity threshold (or "MPT"). The MPT may be an attenuation code ranging between 0 and 10 which indicates the power level of the mobile terminal. Mobile terminals in the inner tier are classified as having a moderate probability of interference (or "MPI") while mobile terminals in the outer tier are classified as having a low probability of interference (or "LPI").

A careless setting of the MPT can dramatically affect the rate of noisy and/or dropped calls. In high traffic cells, setting the MPT and monitoring call quality to ensure that the MPT is properly set has proven to be a difficult task. Furthermore, even if the MPT has been properly set, changing conditions within the cell may necessitate a change in the MPT. For example, many base station radio transceivers operate dynamically. A dynamic base station radio transceiver monitors channel interference in real-time and, based upon the detected level of channel interference, automatically determines to which tier the base station radio transceiver is assigned. If one or more base station radio transceivers within a cell automatically switches tiers, for example, by switching from the outer tier to the inner tier upon detecting an increased level of channel interference, the cell may be left with an insufficient number of base station radio transceivers in the outer tier to handle all of the mobile terminals within that tier requesting service. As a result, call quality would be lowered due to the increased number of dropped calls while potential call revenue would remain unrealized.

SUMMARY OF THE INVENTION

It is, therefore, the object of this invention to provide a cellular mobile communications system capable of adjusting the tier boundary of a power level tiered cell thereof based upon changing operating conditions therein. By adjusting the tier boundary for the cell, the likelihood of a radio transceiver being available to serve a mobile terminal assigned to one of the tiers is increased and the likelihood of the mobile terminal being dropped is diminished.

In accordance with one embodiment, the present invention is of a power level tiered cellular telephone system having a controller and a base station which includes a plurality of radio transceivers. Each of the radio transceivers is configured for serving mobile terminals within the cell and are initially assigned to either a first or second tier of the cell. When a mobile terminal operates within the cell, the mobile terminal is first assigned to one of the first or second tier based upon a power level for the mobile terminal relative to a power level threshold boundary and thereafter serviced by one of the radio transceivers assigned to that tier. The controller periodically shifts the power level threshold boundary defining an outer peripheral edge of the first tier of the cell based upon a change in an operating condition within the cell. By shifting the power level threshold boundary, certain mobile terminals which would have previously been assigned to one tier are instead assigned to the other. In one aspect of this embodiment of the invention, the operating condition for which a change results in a shifting of the power level threshold boundary is a ratio of the number of radio transceivers serving the first tier to the number of radio transceivers serving the cell. In an alternate aspect thereof, the operating condition is a ratio of the number of channels serving the first tier and the number of channels serving the cell. In another aspect of this embodiment of the invention, the radio transceivers are dynamic radio transceivers capable of changing the tier which they serve.

In another embodiment, the present invention is of a power level tiered cellular telephone system for serving mobile terminals. The cellular telephone system provides service for a cell divided into an inner tier and an outer tier. Mobile terminals operating in the outer tier experience lower levels of interference than those operating in the inner tier. The cellular telephone system includes a base station and a mobile switching center coupled to the base station. The base station includes a plurality of dynamic radio transceivers and an antenna array coupled to each of the dynamic radio transceivers. The dynamic radio transceivers are initially assigned to a selected one of the inner and outer tiers of the cell and initially serve mobile terminals operating within the tier to which they have been assigned. Thereafter, the dynamic radio transceivers can independently switch the tier for which they serve mobile terminals. The cellular telephone system further includes a processor subsystem on which a first software module executes. The software module is configured to assign each one of the mobile terminals to a selected dynamic radio transceiver based upon a power level for the mobile terminal when the mobile terminal initiates operations within the cell relative to a power level threshold boundary which defines an outer peripheral edge of the inner tier of the cell. The first software module also periodically re-determines the power level threshold boundary defining the outer peripheral edge of the inner tier of the cell each time one of the radio transceivers switches from serving mobile terminals operating in one tier of the cell to serving mobile terminals operating in the other tier of the cell. In one aspect of this embodiment of the invention, the cellular telephone system further includes a memory subsystem, accessible by the first software module, for maintaining a list of the dynamic radio transceivers, an indicator as to which tier each one of the dynamic radio transceivers serve and an indicator as to available channels for each one of the dynamic radio transceivers serving the inner tier or serving the outer tier.

In a further aspect of the invention, the cell is divided into at least two sectors, each having a sector inner tier, a sector outer tier and a sector power level threshold boundary which defines an outer peripheral edge of the sector inner tier. In this aspect, the antenna array comprises at least two antennas, each providing coverage for a corresponding sector of the cell. Each one of the radio transceivers are assigned to a selected one of the at least two sectors and initially serve mobile terminals in either the inner tier or the outer tier for the sector to which they are assigned. In a still further aspect thereof, the software module periodically re-determines the sector power level threshold boundary which defines the peripheral edge of the inner tier for one of the at least two sectors of the cell each time one of the radio transceivers assigned to that sector switches from serving mobile terminals operating in one of the sector inner tier and the sector outer tier to serving mobile terminals operating in the other one of the sector inner tier and the sector outer tier.

In still another embodiment, the present invention is directed to a method of adaptively power tiering a cell of a cellular telephone system. In accordance with the method, a value for a mobile proximity threshold boundary is determined. The cell is then separated into first and second tiers with the mobile proximity threshold boundary defining a peripheral edge of the first tier. The value of the mobile proximity threshold boundary is periodically re-determined and, each time the value of the mobile proximity threshold boundary changes, the first tier of the cell is re-sized. In one aspect thereof, the value for the mobile proximity threshold boundary is re-determined upon detecting a change in an operating condition for the cellular telephone system. In another, each one of the dynamic radio transceivers are assigned to serve mobile terminals operating in a selected one of the first and second tiers. In this aspect, the value for the mobile proximity threshold boundary is re-determined each time one of the dynamic radio transceivers changes from serving mobile terminals operating in one of the first and second tiers to serving mobile terminals operating in the other of the first and second tiers.

In still yet another embodiment, the present invention is directed to a method of adaptively power tiering a cell of a cellular telephone system. A plurality of radio transceivers is provided. The cell is divided into first and second parts, each having an area. Each one of the plurality of radio transceivers are assigned to a selected one of the first and second parts of the cell. Each one of the plurality of radio transceivers assigned to the first part of the cell serves mobile terminals operating in the first part of the cell and each one of the plurality of radio transceivers assigned to the second part of the cell serves mobile terminals operating in the second part of the cell. The area of the first part is adjusted each time one of the plurality of radio transceivers serving mobile terminals operating in one of the first and second parts switches to serving mobile terminals operating in the other one of the first and second parts.

In one aspect thereof, a ratio of the number of radio transceivers assigned to the first part of the cell to the area of the first part of the cell is determined. In a further aspect thereof, the area of the first part is adjusted to maintain the ratio of the number of radio transceivers assigned to the first part of the cell to the area of the first part of the cell each time one of the plurality of radio transceivers serving mobile terminals operating in one of the first and second parts switches to serving mobile terminals operating in the other one of the first and second parts.

In still another alternate aspect thereof, the first tier of the cell is an inner tier and the second tier of the cell is an outer tier. In this aspect, a ratio of the number of radio transceivers assigned to the inner tier of the cell to the number of radio transceivers in the plurality of radio transceivers and a ratio of the square of the radius of the inner tier to the square of the radius of the cell are determined. In a further aspect of this embodiment of the invention, each time one of the plurality of radio transceivers serving mobile terminals operating in one of the inner and outer tiers switches to serving mobile terminals operating in the other one of the inner and outer tiers, a ratio of the number of radio transceivers assigned to the inner cell to the number of radio transceivers in the plurality of radio transceivers is re-determined. The radius of the inner tier is then re-determined such that the ratio of the square of the radius of the inner tier to the square of the radius of the cell remains constant. The power tiered cell is then re-tiered in accordance with the re-determined radius of the inner tier of the cell.

In yet another embodiment, the present invention is of a method of servicing mobile terminals operating within a power tiered cell which includes an inner tier and an outer tier using a plurality of communication channels. Each one of the plurality of communication channels are assigned to either the inner tier or the outer tier. A determination is then made as to whether a first mobile terminal to be served is operating in the inner tier or the outer tier. If the first mobile terminal is operating in the inner tier, service to the first mobile terminal is provided over an available channel of the channels assigned to serve mobile terminals operating in the first tier. If, however, the first mobile terminal is operating in the outer tier, service to the first mobile terminal is provided over an available channel of the channels assigned to serve mobile terminals operating in outer tier. When a switch of one of the channels assigned to serve mobile terminals operating in a first one of the inner and outer tiers to serving mobile terminals operating in the other one of the inner and outer tiers is detected, the inner tier is re-sized such that a ratio of the area of the first tier to the area of the cell matches a ratio of the number of channels serving mobile terminals operating in the inner tier to the number of channels serving mobile terminals operating in the cell. A determination is then made as to whether a next mobile terminal to be served is operating in the inner tier or the outer tier. If the next mobile terminal is operating in the inner tier, service to the next mobile terminal is provided over a next available one of the channels assigned to serve mobile terminals operating in the inner tier. If, however, the first mobile terminal is operating in the outer tier, service to the first mobile terminal is provided over a next available one of the channels assigned to serve mobile terminals operating in the outer tier. By re-sizing the inner tier, the inner and outer tiers maintain a constant density of assigned channels per unit area.

In one aspect of this embodiment of the invention, to determine whether a first mobile terminal to be served is operating in the inner tier or the outer tier, a power level for the first mobile terminal is compared to a power level threshold boundary which defines an outer peripheral edge of the inner tier and, based upon this comparison, the tier in which the first mobile terminal operates is determined. In another aspect thereof, to re-size the inner tier such that a ratio of the area of the inner tier to the area of the cell matches a ratio of the number of channels serving mobile terminals operating in the inner tier to the number of channels serving mobile terminals operating in the cell, the power level threshold boundary which defines the peripheral edge of the inner tier is adjusted such that the ratio of the area of the first tier to the area of the cell matches the ratio of the number of channels serving mobile terminals operating in the inner tier to the number of channels serving mobile terminals operating in the cell. In still another aspect thereof, to determine whether a next mobile terminal to be served is operating in the inner tier or the outer tier, a power level for the next mobile terminal is determined. The determined power level for the next mobile terminal is then compared to the adjusted power level threshold value to determine whether the next mobile terminal is operating in the first tier or the second tier.

BRIEF DESCRIPTION OF THE DRAWINGS

FIG. 1 is a block diagram of a cellular mobile communications system constructed in accordance with the teachings of the present invention.

FIG. 2 illustrates a tiered cell of the cellular mobile communications system of FIG. 1.

FIG. 4 illustrates a tiered sector cell of an alternately configured cellular mobile communications system.

DETAILED DESCRIPTION

Figure 3:
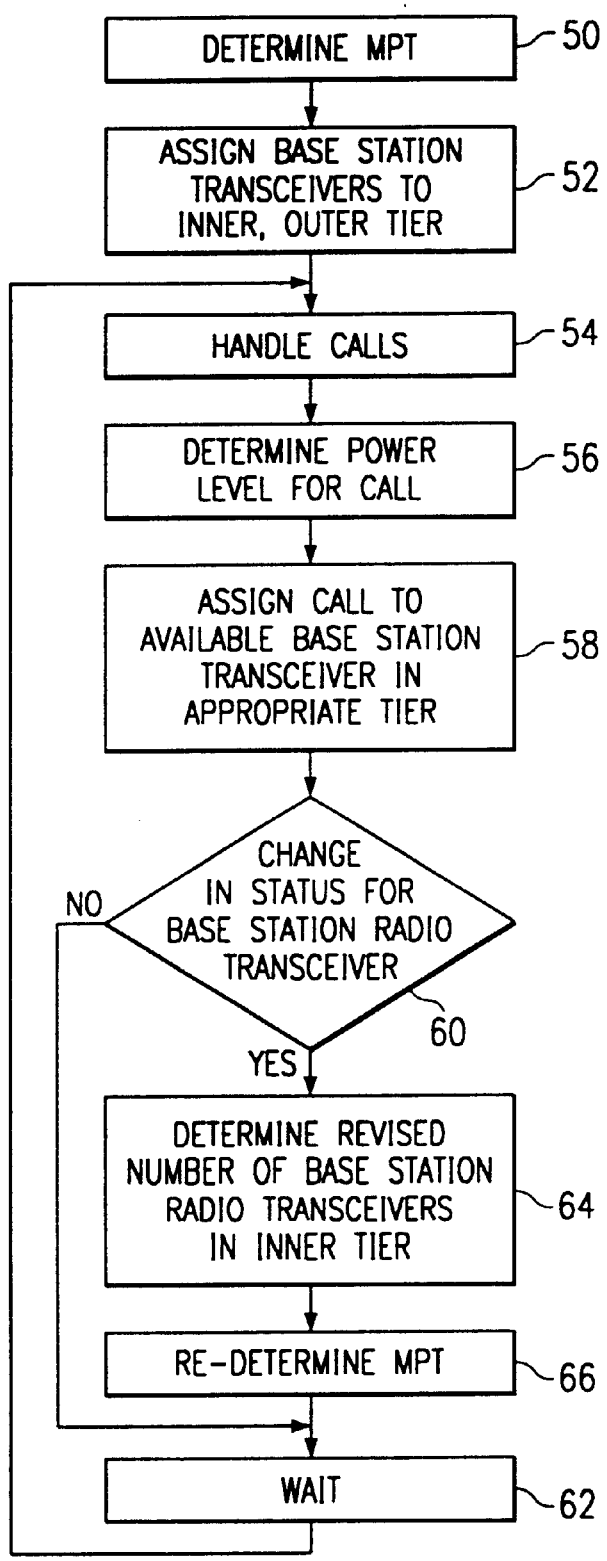
FIG. 3 is a flow chart of a method for adjusting the MPT for the tiered cell of FIG. 2 based upon operating conditions within the cell.

Referring first to FIG. 1, the reference numeral 10 designates a telecommunications network 10. As illustrated herein, the telecommunications network 10 includes a digital wireless telephone system 10a, for example, a cellular mobile communications network, and a wireline telecommunications system 10b, for example, the public switched telephone network (or "PSTN"). The cellular mobile communications network 10a includes a mobile terminal 12 which, for example, may be a voice terminal such as a mobile cellular telephone. The cellular mobile communications network 10a also includes a base station 14 to which the mobile terminal 12 is coupled by an airlink 16. As will be more fully described below, exchanges of information between the mobile terminal 12 and a switch 18, for example, a mobile switching center, are transferred via the base station 14 and an intelligent cellular peripheral (or "ICP") 15. In turn, the MSC 18 directs received information to its destination which, for example, may be a second wireless terminal (not shown) coupled to the MSC 18 (via either the base station 14 or another base station not shown in the drawings), a wireless terminal coupled to a second MSC (also not shown), or, as illustrated herein, to a wireline terminal 24 located within the PSTN 10b and coupled to the MSC 18 by an interexchange carrier (or "IXC") 20 and a local exchange carrier (or "LEC") 22. As illustrated herein, the wireline terminal 24, like the mobile terminal 12, is a voice terminal such as a telephone. Of course, while the wireline terminal 24 is shown as the destination of the voice signal originating at the mobile terminal 12, it should be further understood that the voice signal may be directed via other IXCs (not shown) and LECs (also not shown) of the PSTN 10b to any of the multitude of wireline terminals forming part of the PSTN 10b. Furthermore, in alternate configurations of the telecommunications network 10, the wireless telephone network 10a may be a personal communication service (or "PCS") system or other type of wireless system while the wireline telecommunication system 10b may be a private network or other type of wireline system. Of course, the telecommunications network 10 may further include plural wireless and/or wireline systems of the aforementioned or other types.

The base station 14 includes an antenna array 26 which transmits and receives messages being exchanged between the base station 14 and the various mobile terminals 12 operating in a defined geographic area commonly referred to as a "cell". As described herein, the antenna array 26 comprises one or more omni-directional antennas, each capable of 360 degree coverage of the cell. Alternately, the antenna array 26 may comprise plural directional antennas, each configured to provide partial coverage of the cell. For example, the antenna array 26 may comprise three 120 degree directional antennas positioned to collectively provide fall coverage for the cell.

Coupled to the antenna array 26 are plural radio transceivers 28-1 through 28-N. Each radio transceiver 28-1 through 28-N is configured to both transmit and receive messages between the base station 14 and a selected mobile terminal 16 over a channel comprised of two frequencies-one for the forward link and another for the reverse link. A typical radio transceiver 28-1 through 28-N has three radio channels. Accordingly, each radio transceiver 28-1 through 28-N can complete a voice or data connection with three mobile terminals such as the mobile terminal 12. As will be more fully described below, each radio transceiver 28-1 through 28-N is initially assigned to either an inner tier or an outer tier of the cell. Preferably, each radio transceiver 28-1 through 28-N is a dynamic radio transceiver. A dynamic radio transceiver continuously monitors the noise level on its radio channels and, based on the monitored noise level, will automatically switch between operation as an inner tier radio transceiver and an outer tier radio transceiver. For example, a dynamic radio transceiver initially assigned to the outer tier will automatically switch to the inner tier should the monitored noise level exceed a preselected threshold value. Conversely, a dynamic radio transceiver initially assigned to the inner tier will automatically switch to the outer tier should the monitored noise level drop below the preselected threshold value.

Base station controller 30 handles the exchange of messages between the MSC 18 and selected ones of the radio transceivers 28-1 through 28-N. The base station controller 30 performs various functions such as arbitration between the plural incoming and outgoing messages to be exchanged between various mobile terminals (via the radio transceivers 28-1 through 28-N) and the MSC 18. Of course, the aforementioned function is but one example of the functions performed by the base station controller 30. It is fully contemplated, therefore, that the base station controller 30 may perform other functions not specifically set forth herein.

As may be further seen in FIG. 1, the ICP 15 is coupled between the base station 14 and the MSC 18. As will be more fully described below, the ICP 15 performs certain functions off-loaded from the base station 14 and/or the MSC 18. More specifically, whenever a call is established with a mobile terminal located within a cell, the ICP 15 assigns the mobile terminal to a selected channel available for the call. Further, whenever a radio transceiver switches tiers, the ICP 15 re-sizes the inner tier of the cell to maintain a constant ratio of radio transceivers serving the inner tier to the area of the inner tier of the cell. It is fully contemplated, however, that some or all of the various functions off-loaded to the ICP 15 could instead be incorporated into the base station 14, the MSC 18, or another ICP (not shown) coupled to one of the base station 14 or the MSC 18. If desired, the various functions could be distributed among a combination of the base station 14, the MSC 18 and/or another ICP.

The MSC 18 performs various functions for the cellular mobile communications network 10a. Its primary function is to provide switching between the cellular mobile communications network 10a and the PSTN 10b. For example, if the mobile terminal 12 requests a connection with the wireline terminal 24, the MSC 18 directs the request to the IXC 20. Conversely, when the wireline terminal 24 requests a connection with the mobile terminal 12 and the mobile terminal 12 is registered with the MSC 18, the MSC 18 will direct the request to the mobile terminal 12. In addition to switching services, the MSC 18 also controls calls, tracks billing information and locates cellular subscribers. As with the base station controller 30, the aforementioned functions of the MSC 18 are purely exemplary. Thus, it is again contemplated, therefore, that the MSC 18 may perform other functions not specifically set forth herein.

It should be clearly understood that the cellular mobile communications network 10a illustrated in FIG. 1 has been simplified greatly for ease of description and that various components thereof have been omitted or otherwise simplified. Thus, the base station 14, the ICP 15 and the MSC 18 include a number of hardware and/or software components that are not described and illustrated herein. As illustrated herein, the MSC 18 include a processor subsystem 32 and a memory subsystem 34 coupled together by a bi-directional address, data and control bus 33. Residing in the memory subsystem 34 and executable by the processor subsystem 32 of the MSC 18 is a call processing (or "CP") module 36 which, in conjunction with a home location register (or "HLR") and a visitor location register (or "VLR") (both not shown in FIG. 1) which form a portion of the memory subsystem 34, performs authentication, call establishment and billing services for calls between the mobile terminal 12 and other mobile terminals (not shown) and wireline terminals such as the wireline terminal 24.

Similarly, the ICP 15 includes a processor subsystem 17 and a memory subsystem 19 coupled together by a bi-directional address, data and control bus 21. Residing within the memory subsystem 19 and executable by the processor subsystem 17 of the ICP 15 is a mobile proximity threshold (or "MPT") module 38. Among its functions, the MPT module 38 assigns incoming calls to selected channels of the radio transceivers 28-1 through 28-N. To perform this function, prior to completion of a connection with the mobile terminal 12, the base station 14 measures a power level for the mobile terminal 12. For example, whenever the mobile terminal 12 issues a request for connection, registers or re-registers with the MSC 18 over the control channel, the base station 14 measures the power level for the mobile terminal 12. The monitored power level information for each mobile terminal is transferred to the ICP 15 where it is used in assigning a radio transceiver 28-1 through 28-N for communications with the mobile terminal 12. For example, the ICP 15 may maintain, in the memory subsystem 19, a list of available channels, the radio transceiver 28-1 through 28-N assigned to the available channels, and whether the radio transceiver 28-1 through 28-N has been assigned to the inner or outer tier. Upon receiving the power level for the mobile terminal 12 in connection with a request for connection, the MPT module 38 would compare the received power level with the MPT value. Based upon this comparison, the MPT module 38 would determine whether an inner tier radio transceiver or an outer tier radio transceiver should be used for communications with the mobile terminal 12. Upon determining whether an inner or outer tier radio should be used, the MPT 38 selects one of the radio transceivers 28-1 through 28-N which: (1) is serving the appropriate tier; and (2) has an available channel. The MPT module 38 would then instruct the base station controller 30 to complete the requested connection using the selected radio transceiver 28-1 through 28-N.

The MPT module 38 also periodically modifies the MPT for the cell being served by the radio transceivers 28-1 through 28-N and the antenna array 26. As the MPT for the cell changes, the determination as to whether a mobile terminal, for example, the mobile terminal 12, is to be assigned to a radio transceiver serving the inner tier or the outer tier will vary. Thus, since the MPT varies in relation to the number of radio transceivers serving the respective tiers, by varying the MPT, the likelihood of a radio transceiver being available to serve a mobile terminal assigned to one of the tiers is increased.

In the present application, the MPT module 38 re-determines the MPT by periodically polling the radio transceivers 28-1 through 28-N via the base station controller 30 to detect changes in status thereof. If a change in status is detected, the MPT module 38 re-determines the MPT in the manner more fully set forth below. Alternately, the radio transceivers 28-1 through 28-N could report any changes in status to the MPT module 38 and, in response to a reported change in status, the MPT module 38 could perform a re-determination of the MPT. Furthermore, while re-determination of the MPT is performed by a discrete software module, referred to as the MPT module 38, residing at the ICP 15 and interacting with the base station controller 30 and the CP module 36, it is fully contemplated that the MPT module 38 could either be a discrete software module or integrated into an existing software module that resides at either the base station 14 or the MSC 18.

Referring next to FIG. 2, a cell 40 of the cellular mobile communications network 10a of FIG. 1 can now be seen. Located at the general center of the cell is the omnidirectional antenna array 26 of the base station 14 which serves the cell 40. As may now be seen, the cell 40 is divided into two tiers—an inner tier 42 and an outer tier 44. Defining an outer peripheral edge of the inner tier 42 is MPT 46. An outer peripheral edge of the outer tier 44, on the other hand, is the boundary of the cell 40. Thus, the outer tier 44 and the cell 40 itself are completely co-extensive. Placement of a mobile terminal, for example, mobile terminals 12-1 and 12-2 within one of the inner and outer tiers 42 and 44 is based upon the power level for messages being exchanged between the mobile terminal 12-1 or 12-2 and the antenna array 26. For example, a lower power level has been detected for the mobile terminal 12-1. The mobile terminal 12-1 has, therefore, been assigned to the inner tier 42. Conversely, a higher power level has been detected for the mobile terminal 12-2. Accordingly, the mobile terminal 12-2 has been assigned to the outer tier 44. Typically, mobile terminals such the mobile terminals 12-1 and 12-2 are assigned to either the inner or outer tier 42 or 44 based upon the strength of the signal detected by the base station 14 upon establishment of a connection between the base station 14 and the mobile terminal and the MPT 46 represents a measured relative attenuation code for detected signals which separates whether the mobile terminal transmitting the detected signal is assigned to the inner tier 42 or the outer tier 44.

Initially, half of the radio transceivers 28-1 through 28-N are assigned to serve mobile terminals in the inner tier 42 while the other half are assigned to serve mobile terminals in the outer tier 44. The MPT 46 is then set at an attenuation level such that, when the attenuation level is measured for the mobile terminals seeking service, half would have an attenuation level above the MPT 46 while the other half would have an attenuation level below the MPT 46. In this manner, the number of mobile terminals in each tier 42 and 44 and the number of radio transceivers 28-1 through 28-N serving that tier would be evenly divided. However, the use of dynamic radio transceivers as the radio transceivers 28-1 through 28-N quickly upset the proportionate distribution of radio transceivers and mobile terminals between the inner and outer tiers 42 and 44. More specifically, if one or more dynamic radio transceivers independently decides to switch tiers, it is entirely possible that a previously existing proportionate distribution of radio transceivers and mobile terminals would be destroyed. However, by adjusting the MPT 46, the present invention compensates for such changes by causing some of the mobile terminals which, prior to the adjustment of the MPT 46, would have been assigned to one tier, to be assigned to the other tier.

Adjustment of the MPT 46 may be used to maintain the channel (or radio transceiver) density, i.e., the number of channels (or radio transceivers) per unit area, because of the following relationships. More specifically, for the cell 40, the following relationship holds:

$$\frac{\text{Inner tier radio traffic channels}}{\text{Total cell radio traffic channels}} = \frac{\text{Inner tier area}}{\text{Total cell area}}. \tag{1}$$

As the area of each of the inner tier 42 and the cell 40 are equal to $\pi r^2$ and $\pi R^2$, respectively, $\pi$ cancels out, leaving:

$$\frac{\text{Inner tier area}}{\text{Total cell area}} = \frac{r^2}{R^2}. \tag{2}$$

The radius of the cell 40, R, is determined from the path loss (in decibels) for the outer tier 44:

$$\text{Path Loss in decibels} = A + B \times \log(R) = PL(R) \tag{3}$$

or:

$$R = 10^{\frac{PL(R)-A}{B}} \tag{4}$$

where A and B are constants.

Similarly, the radius of the inner tier 42, r, is determined from the path loss (in decibels) for the inner tier 42:

$$\text{Path Loss in decibels} = A + B \times \log(r) = PL(r) \tag{5}$$

or:

$$r = 10^{\frac{PL(r)-A}{B}} \tag{6}$$

where A and B are constants.

Thus, the ratio of the radii r and R is:

$$\frac{r}{R} = 10^{\frac{PL(r)-A}{B} - \frac{PL(R)-A}{B}}. \tag{7}$$

Canceling out A yields:

$$\frac{r}{R} = 10^{\frac{PL(r)-PL(R)}{B}} \tag{8}$$

or:

$$\left(\frac{r}{R}\right)^2 = 10^{\frac{2 \times (PL(r)-PL(R))}{B}}. \tag{9}$$

From Equations (1) and (2), the following relationship is determined:

$$\left(\frac{r}{R}\right)^2 = \left(\frac{\text{Inner tier radio traffic channels}}{\text{Total cell radio traffic channels}}\right). \tag{10}$$

Note that PL(R)−PL(r) is a difference in decibels which is equal to the number of dB that the MPT 46 is above the cell edge. Thus, if:

x=number of inner tier radio traffic channels; and
y=number of total cell radio traffic channels;
then:

$$\left(\frac{x}{y}\right) = 10^{\frac{2 \times (PL(r)-PL(R))}{B}} \tag{11}$$

or $$\sqrt{\frac{x}{y}} = 10^{\frac{PL(r)-PL(R)}{B}}; \tag{12}$$

$$\text{LOG}\left(\sqrt{\frac{x}{y}}\right) = \frac{PL(r)-PL(R)}{B}; \tag{13}$$

$$PL(r) - PL(R) = B \times \text{LOG}\left(\sqrt{\frac{x}{y}}\right); \tag{14}$$

$$PL(R) - PL(r) = B \times \text{LOG}\left(\sqrt{\frac{y}{x}}\right). \tag{15}$$

In a typical cellular system such as the cellular mobile communications network 10a, each attenuator step is equal to 4 dB. Thus, equation (15) may be expressed as the following:

$$\text{Attenuator steps above the cell edge} = \frac{B}{4} \times \text{LOG}\left(\sqrt{\left(\frac{Y}{X}\right)}\right). \tag{16}$$

The attenuator step at the cell edge is datafilled as VMAC, so:

$$MPT = VMAC + \left[\left(\frac{B}{4}\right) \times \text{LOG}\left(\sqrt{\left(\frac{Y}{X}\right)}\right)\right]. \tag{17}$$

B is an RF propagation decay constant, which is defined as 3.4 in 800 MHZ cellular systems and 4.0 in 1.9 Ghz cellular system. There are also switch datafill entities known as TIERVMAX and OVERFLOW. TIERVMAX is the attenuator step limit for the radio transceivers 28-1 through 28-N assigned to the inner tier 42. TIERVMAX must be equal to or greater than VMAC and less than or equal to 10. In other words, $$10 \geq \text{TIERVMAX} \geq \text{VMAC}. \tag{18}$$

OVERFLOW can be enabled or disabled. If OVERFLOW is disabled, then the MPT 46 is limited so that it is greater than or equal to TIERVMAX. In other words, $$10 \geq \text{MPT} \geq \text{TIERVMAX} \tag{19}$$

If OVERFLOW is enabled, the MPT 46 is limited so that it is greater than or equal to VMAC. In other words:

$$10 \geq \text{MPT} \geq \text{VMAC} \tag{20}$$

Referring next to FIG. 3, a method of call processing which incorporates the selective assignment of mobile terminals to tiers within a tiered cellular mobile communications system based upon a dynamically re-determined MPT will now be described in greater detail. The method commences at step 50 with an initial determination of the MPT 46 for the cell 40. Oftentimes, the initial determination of the MPT 46 is made during the design of the cellular system. Conversely, the MPT 46 can be determined after detailed analysis of the cell 40 during cellular operations. A suitable initial determination of the MPT 46 may be made by presuming that the mobile terminals conducting operations within the cell 40 are uniformly distributed throughout the cell 40. If the mobile terminals conducting operations within the cell 40 are uniformly distributed throughout the cell 40, the MPT 46 would be set such that the areas of the inner tier 42 is one-half the area of the cell 40. Using equation (10), above, if the radius R of the cell 40 had a value of 10, the radius r (the MPT 46 for the cell) of the inner tier 42 would have a value equal to the square root of 50 or about 7.1. Of course, in this calculation, as well as the calculations to follow, the MPT 46 is determined as a relative value which ranges between zero and ten. Alternately, the actual value of the MPT 46 as an attenuation (in dB) of a power level for a detected signal may instead be calculated. Of course, such a determination of the value of the MPT 46 would be based upon VMAC, the minimum level of signal attenuation for which communications may still be conducted at the outer periphery of the cell 40.

After the initial determination of the MPT 46, the method proceeds to step 52 where each base station radio transceiver 28-1 through 28-N is initially assigned to either the inner tier 42 or the outer tier 44. A list of the available radio channels (and the corresponding base station radio transceiver 28-1 through 28-N which operates the channel) for each tier is then assembled and maintained in memory. While the list may be maintained by a wide variety of devices and/or locations within the cellular mobile communications network 10a, one suitable location would be within a selected area of the memory subsystem 19 of the ICP 15. Furthermore, while the list may be variously configured, it is contemplated that it may resemble the list set forth in Table I, below:

TABLE I

| Radio Transceiver No. | Channel No. | Tier | Availability |
| --- | --- | --- | --- |
| 28-1 | 1 | inner | yes |
| 28-1 | 2 | inner | yes |
| 28-1 | 3 | inner | yes |
| 28-2 | 1 | inner | yes |
| 28-2 | 2 | inner | yes |
| 28-2 | 3 | inner | yes |
| 28-N | 1 | outer | yes |
| 28-N | 2 | outer | yes |
| 28-N | 3 | outer | yes |

The aforementioned steps are preparatory steps that would normally be performed by the service provider during construction, improvement or maintenance of the cellular mobile communications network 10a.

Continuing on to step 54, the incorporation of the disclosed method of adaptively tiering a cell of a cellular mobile communications network into a call processing technique will now be described in greater detail. Call processing commences at step 54 with a request for the base station 14 to handle a call. The request may originate from various sources. For example, a mobile terminal registered with the MSC 18 and located within the cell 40 may issue a request for connection which is received by the base station 14. Alternately, a mobile terminal already engaged in a call may be handed-off to the base station 14 when it enters the cell 40. Finally, a wireline or mobile terminal may request a connection to a mobile terminal registered with the MSC 18 and located in the cell 40.

In all of these cases, the base station 14 must now assign a radio channel to handle exchanges with the mobile terminal 12. Accordingly, at step 56, the power level for the call is determined. Typically, power level is determined from a signal, for example, a call request, transmitted by the mobile terminal 12 and received by the base station 14 over a control channel. The base station 14 transfers the detected power level for the proposed connection to the MPT module 38 of the ICP 15 with the other information normally procured in connection with a call set-up. The MPT module 38 assigns the connection to a selected channel and radio transceiver before passing the received information to the CP module 36 of the MSC 18 for authentication, call set-up and/or other call processing procedures. To do so, the MPT module 38 compares the detected power level for the mobile terminal 12 to the MPT 46. Based upon the comparison, the MPT module 38 assigns the mobile terminal 12 to either the inner tier 42 or the outer tier 44. More specifically, if the power level is greater than the MPT 46, the mobile terminal 12 is assigned to the outer tier 44. Conversely, if the power level is less than the MPT 46, the mobile terminal 12 is assigned to the inner tier 42.

The MPT module 38 then looks for an available channel to assign to the mobile terminal. For example, if the mobile terminal was assigned to the inner tier 42, the MPT module 38 would review the list of available channels maintained in the memory subsystem 19. If the review of the list of available channels identifies an available inner tier channel and radio transceiver, the mobile terminal 12 is assigned to the identified available inner tier channel and radio transceiver. If a review of the list of available channels indicates that there are no available inner tier channels, the MPT module 38 would then check for available outer tier channels in a further review of the list. If the further review of the list indicates that an outer tier channel is available, the mobile terminal 12 is assigned to the available outer tier channel and radio transceiver. If, however, the further review indicates that there are also no available outer tier channels, the requested connection is dropped.

It is contemplated that the MPT module 38 may review the list of available channels in a variety of methods. For example, the MPT module 38 may start at the top of the list and check the third field of the uppermost entry to determine if the channel is available. If the channel is available, the MPT module 38 updates the availability field of the channel entry and assigns the mobile terminal 12 to the selected channel. Alternately, the list maintained in the memory subsystem 19 may be configured as a pair of queues-one comprised of a list of available inner tier channels and the other comprised of a list of available outer tier channels. When a channel in one of the tiers is needed to complete a connection, the MPT module 38 would reserve the channel identified at the front of the queue and then delete the reserved channel from the queue. The remaining channels in the queue would then move up one spot. When inner or outer tier channels become available, an entry identifying the newly available channel would be added to the rear of the queue to await selection.

Upon identifying an available channel and radio transceiver assigned to the same tier to which the mobile terminal has been assigned, the identified available channel and radio transceiver are assigned to the call at step 58 and, in the next transmission from the MPT module 38 of the ICP 15 to the base station controller 30 of the base station 14, the MPT module 38 advises the base station controller 30 as to which one of the radio transceivers 28-1 through 28-N and which channel thereof are to be used for further exchanges with the mobile terminal 12. The call would then proceed conventionally using the selected channel and radio transceiver for exchanges between the mobile terminal 12 and the base station 14.

As previously set forth, the radio transceivers 28-1 through 28-N are dynamic radio transceivers which, while assigned to one of the inner or outer tiers 42 or 44, will independently switch between tiers whenever conditions warrant such a switch. For example, a dynamic radio transceiver assigned to the outer tier 44 will automatically switch to the inner tier 42 upon detecting a sufficiently great increase in interference over its channels, for example, the interference generated by a power burst.

Proceeding on to step 60, if a radio transceiver, for example, the radio transceiver 28-1, changes tiers, the radio transceiver issues a message to the MPT module 38 as to the tier change. For example, as illustrated herein, the radio transceiver 28-1 would issue a tier change message to the base station controller 30 which, in turn, would advise the MPT module 38 of the tier change. The MPT module 38 would update the list of channels/radio transceivers maintained in the memory subsystem 19. For example, if the list maintained in the memory subsystem was configured as illustrated in Table I, the MPT module 38 would revise the fourth field of all of the channel entries for the radio transceiver 28-1 to reflect the tier to which the radio transceiver was now operating. Alternately, if a pair of queues were maintained, the entries would be moved between queues. Alternately, the MPT module 38 could periodically poll the base station controller 30 which, in turn, could determine which tier each of the radio transceivers 28-1 through 28-N are operating. Of course, it should again be understood that the functions disclosed as being performed within the MPT module 38 of the ICP 15 could instead be performed by the base station controller 30 or other device located at the base station 14, the MSC 18 or even by an ICP operating as an adjunct device coupled to the MSC 18 and accessible thereby whenever adaptive tier determinations must be executed and not as an intermediary device, located between the base station 14 and the MSC 18, as shown in FIG. 1.

If the MPT module 38 of the ICP 15 does not receive an indication from one of the radio transceivers 28-1 through 28-N that they have changed tiers (or, in the alternate embodiment where the MPT module 38 polls the base station controller 30 for the identity of the tier which each of the radio transceivers 28-1 through 28-N are operating, the MPT module 38 determines that none of the radio transceivers 28-1 through 28-N have changed tiers), the method proceeds to step 62 where the ICP 15 waits for a next message indicating that one of the radio transceivers 28-1 through 28-N has changed tiers. The method then returns to step 54 where the MPT module 38 continues to handle calls in a conventional manner in its role as an intermediate platform located between the base station 14 and the MSC 18. In the alternate embodiment where the MPT module 38 polls for updates of the tier in which the radio transceivers 28-1 through 28-N are operating, during step 62, the method waits a preselected time period between successive polls of the radio transceivers 28-1 thorough 28-N. While awaiting for the next time for the poll to occur, the method returns to step 54 to continue handling incoming calls in conventional fashion.

Returning now to step 60, if a change in status is indicated for one of the base station radio transceiver 28-1 through 28-N, for example, if the radio transceiver 28-1 has switched from the inner tier 42 to the outer tier 44, the method proceeds to step 64 where the MPT module 38 again determines the number of radio channels which are serving inner tier mobile terminals. Recalling from equation (10) that the ratio of inner tier radio channels to total number of radio channels is equal to the square of the ratio of the radius r (the MPT 46) to the radius R (cell 40 edge VMAC), at step 66, the MPT 46 is re-determined using the revised ratio of inner tier radio channels to total number of radio channels. Again, the MPT 46 may be numerically determined as an attenuation loss in dB or may be determined as a relative value (in comparison to the outer periphery of the cell 40 which has a presumed value or 10). For example, using the prior example in which there were 6 available radios transceivers (or 18 available channels) in the inner tier 42, 12 available radio transceivers (or 36 available channels) in the cell 40, if one radio transceiver switches from the inner tier 42 to the outer tier 44, the number of available channels for mobile terminals assigned to the inner tier 42 drops from 18 to 15 and the relative MPT would drop from about 7.1 to about 6.5.

Having re-determined the MPT at step 66, thereafter, the method proceeds to step 62 where it awaits a next change in status for a radio transceiver and, in the interim, proceeds on to step 54 where call processing of incoming calls again proceeds in a conventional manner. Now, however, the MPT 46 has been lowered from 7.1 to 6.5. As a result, certain mobile terminals which would have previously been assigned to the inner tier 42 would now be assigned to the outer tier 44. Thus, the MPT 46 has been modified to reflect a change in the number of radio channels providing service for mobile terminals operating at signal strengths above or below the MPT 46. Specifically, as more radio transceivers began operating in the outer tier, the MPT 46 was readjusted so that more of the mobile terminals seeking to operate in the cell 40 would be assigned to the tier having more of the mobile radios.

Referring next to FIG. 4, an alternate embodiment of the invention will now be described in greater detail. In the embodiment disclosed in FIGS. 1–3, the antenna array 26 was omnidirectional and the cell 40 was unsectored. In this embodiment, however, the antenna array is comprises three directional antennas 26-1, 26-2 and 26-3 and cell 40' is divided into first, second and third sectors 40-1, 40-2 and 40-3. While it is fully contemplated that the cell 40' may be divided into any number of equal or unequal sized sectors, by way of example, in FIG. 4, the cell 40' is shown as being divided into three sectors of equal area. The sectored cell 40' is power tiered. Thus, the sector 40-1 comprises an sector inner tier 42-1 and a sector outer tier separated by a sector MPT 46-1. Similarly, the sector 40-2 comprises an sector inner tier 40-2 and a sector outer tier 44-2 separated by a sector MPT 46-2 and the sector 40-3 is comprised of an sector inner tier 42-3 and a sector outer tier 44-3 separated by a sector MPT 46-3.

The relationships described herein with respect to the cell 40 are equally applicable to the sectors 40-1 through 40-3 of the sectored cell 40'. For example, the square root of the ratio of the number of radio channels serving mobile terminals operating within the sector inner tier 42-1 of a first sector 40-1 of the cell 40' to the number of radios channels serving mobile terminals operating within the sector 40-1 of the sectored cell 40' would still be proportional to the ratio of the radius of the inner tier 42-1 to the radius of the cell 40'. Here, however, as each sectors 40-1 through 40-3 has a discrete number of radio transceivers serving that sectors, it is contemplated that, based on changes in the operation of the radio transceivers in each one of the sectors 40-1, 40-2 and 40-3, the MPT 46-1, 46-2 and 46-3 could be dramatically different for each respective sector 40-1, 40-2 and 40-3 of the sectored cell 40'.

Thus, there has been described and illustrated herein, a cellular mobile communications network which uses adaptive tiering to compensate for changes in conditions within a tiered cell. However, those skilled in the art should recognize that, although illustrative embodiments of the invention have been shown and described, other modifications, changes, and substitutions are intended in the foregoing disclosure. For example, in the foregoing disclosure, the MPT 46 separating the inner and outer tiers 42 and 44 was redetermined based upon changes in the number of radio transceivers 28-1 through 28-N serving each of the inner and outer tiers 42 and 44. In the alternative, however, the MPT module 38 could monitor the number of available channels serving each tier and, when the number of available channels available for one tier exceeds the number of available channels for the other tier by a preselected threshold value, the MPT module 38 could shift the MPT 46 by a selected amount to force more mobile terminals into the tier having excess channel availability. Shifting the MPT 46 in this fashion could be used in conjunction with the aforementioned technique of re-determining the MPT 46 based upon the ratio of radio transceiver serving the respective tiers since imbalances occurring in the number of available channels for a tier without shifts in the number of radio transceivers serving the tier are caused by inaccuracies in the initial presumption of uniform density of mobile terminals and uniform RF coverage throughout the cell 40. For example, the construction of one or more high-rises or the depression of a highway within the cell 40 could increase interference levels for mobile terminals operating within the cell, thereby destroying the presumed uniform distribution. Accordingly, it is appropriate that the appended claims be construed broadly and in a manner consistent with the scope of the invention.

What is claimed is:

1. A power level tiered cellular telephone system having a cell divided into first and second tiers, comprising:

a base station, said base station including a plurality of radio transceivers, each configured for serving mobile terminals within said cell and assigned to a selected one of said first and second tiers of said cell for serving mobile terminals operating therein;

said base station assigning each mobile terminal served within said cell to one of said first and second tiers based upon a power level for said mobile terminal relative to a power level threshold boundary; and a controller coupled to each one of said plurality of radio transceivers, said controller periodically shifting said power level threshold boundary defining an outer peripheral edge for said first tier of said cell based upon a change in a operating condition within said cell.

2. The power level tiered cellular telephone system according to claim 1 wherein said operating condition is a ratio of the number of radio transceivers serving said first tier to the number of radio transceivers serving said cell.

3. The power level tiered cellular telephone system according to claim 1 wherein said operating condition is a ratio of the number of channels serving said inner tier and the number of channels serving said cell.

4. The power level tiered cellular telephone system according to claim 1 wherein each one of said plurality of radio transceivers is a dynamic radio transceiver capable of changing which one of said first and second tiers are served thereby.

5. The power level tiered cellular telephone system according to claim 1 and further comprising:

an intelligent cellular peripheral coupled to said base station;

said controller residing at said intelligent cellular peripheral.

6. The power level tiered cellular telephone system according to claim 5 and further comprising;

a mobile switching center coupled to said intelligent cellular peripheral.

7. A power level tiered cellular telephone system having a cell, said power level tiered cellular telephone system serving mobile terminals operating within said cell, said cell divided into an inner tier and an outer tier, said mobile terminals operating in said outer tier experiencing lower levels of interference than if operating in said inner tier, said power level tiered cellular telephone system comprising:

a base station, said base station including a plurality of dynamic radio transceivers and an antenna array coupled to each one of said plurality of dynamic radio transceivers, each one of said plurality of dynamic radio transceivers configured for serving mobile terminals within said cell and assigned to a selected one of said inner and outer tiers of said cell for serving mobile terminals operating therein;

an intelligent cellular peripheral having a processor subsystem on which a first software module executes, said intelligent cellular peripheral coupled to said base station;

a mobile switching center having a processor subsystem on which a second software module executes, said mobile switching center coupled to said intelligent cellular peripheral;

said first software module configured for assigning each one of said mobile terminals to a selected one of said radio transceivers based upon a power level for said mobile terminal when said mobile terminal initiates operations within said cell relative to a power level threshold boundary which defines a peripheral edge of said outer tier and periodically re-determining said power level threshold boundary separating said inner and outer tiers of said cell each time one of said plurality of radio transceivers switches from serving mobile terminals operating in one of said inner and outer tiers to serving mobile terminals operating in the other of said inner and outer tiers.

8. The power level tiered cellular telephone system according to claim 7 wherein said intelligent cellular peripheral further comprises a memory subsystem accessible by said first software module, said memory subsystem maintaining a list of said plurality of dynamic radio transceivers, an indicator as to which tier each one of said plurality of dynamic radio transceivers serve and an indicator as to available channels for each one of said plurality of dynamic radio transceivers serving said inner tier or serving said outer tier.

9. The power level tiered cellular telephone system according to claim 7 wherein said second software module is a call processing module.

10. The power level tiered cellular telephone system according to claim 7 wherein said cell is divided into at least two sectors, each having a sector inner tier, a sector outer tier and a sector power level threshold boundary which defines an outer peripheral edge of said sector inner tier and where said antenna array comprises at least two directional antennas, each providing coverage for a corresponding sector of said cell and said plurality of dynamic radio transceivers are assigned to a selected one of said sector inner tier and said sector outer tier of a selected one of said at least two sectors.

11. The power level tiered cellular telephone system according to claim 10 wherein said first software module periodically re-determines said power level threshold defining said outer peripheral edge of said sector inner tier for a first one of said at least two sectors of said cell each time one of said plurality of radio transceivers serving said first one of said at least two sectors of said cell switches from serving mobile terminals operating in one of said sector inner tier and said sector outer tier for said sector to serving mobile terminals operating in the other of said sector inner tier and said sector outer tier for said sector.

12. A method of adaptively power tiering a cell of a cellular telephone system, comprising the steps of:

selecting a value for a mobile proximity threshold boundary;

separating said cell into first and second tiers, each having a respective size, said first tier having an outer peripheral edge defined by said mobile proximity threshold boundary and said second tier having an outer peripheral edge defined by a boundary for said cell;

periodically re-determining said value for said mobile proximity threshold boundary; and re-sizing said first tier each time that said value for said mobile proximity threshold boundary changes.

13. The method of adaptively power tiering a cell of a cellular telephone system according to claim 12 wherein said value for said mobile proximity threshold is re-determined upon detecting a change in an operating condition for said cellular telephone system.

14. The method of adaptively power tiering a cell of a cellular telephone system according to claim 12 wherein said cell is served by a plurality of dynamic radio transceivers and wherein the step of periodically re-determining said value for said mobile proximity threshold boundary further comprises the steps of:

initially assigning each one of said plurality of dynamic radio transceivers for serving mobile terminals operating in said cell to a selected one of said first and second tiers, respectively; and re-determining said value for said mobile proximity threshold boundary each time one of said plurality of dynamic radio transceivers changes from serving mobile terminals operating in one of said first and second tiers to serving mobile terminals operating in the other of said first and second tiers.

15. A method of adaptively power tiering a cell of a cellular telephone system, comprising the steps of:

providing a plurality of radio transceivers to serve mobile terminals operating in said cell;

dividing said cell into first and second power tiers, said first power tier having an area;

assigning each one of said plurality of radio transceivers to a selected one of said first and second power tiers of said cell, each one of said plurality of radio transceivers assigned to said first power tier of said cell serving mobile terminals operating in said first power tier of said cell and each one of said plurality of radio transceivers assigned to said second power tier of said cell serving mobile terminals operating in said second power tier of said cell;

adjusting said area of said first power tier each time one of said plurality of radio transceivers serving mobile terminals operating in one of said first and second power tiers switches to serving mobile terminals operating in the other one of said first and second power tiers.

16. The method of adaptively power tiering a cell of a cellular telephone system according to claim 15 wherein said first power tier has a first area, said cell has a second area and further comprising the step of:

determining a ratio of the number of radio transceivers assigned to said first power tier of said cell to said area of said first power tier of said cell.

17. The method of adaptively power tiering a cell of a cellular telephone system according to claim 16 wherein the step of adjusting said area of said first power tier each time one of said plurality of radio transceivers serving mobile terminals operating in one of said first and second power tiers switches to serving mobile terminals operating in the other one of said first and second power tiers further comprises the step of:

adjusting said area of said first power tier to maintain said ratio of the number of radio transceivers assigned to said first power tier of said cell to said area of said first power tier of said cell.

18. The method of adaptively power tiering a cell of a cellular telephone system according to claim 15 wherein said first power tier is an inner tier, said second power tier is an outer tier and further comprising the steps of:

determining a ratio of the number of radio transceivers assigned to said inner tier of said cell to the number of radio transceivers assigned to said cell; and determining a ratio of the square of the radius of said inner tier to the square of the radius of said cell.

19. The method of adaptively power tiering a cell of a cellular telephone system according to claim 18 wherein the step of adjusting said area of said first power tier each time one of said plurality of radio transceivers serving mobile terminals operating in one of said first and second power tiers switches to serving mobile terminals operating in the other one of said first and second power tiers further comprises the steps of:

each time one of said plurality of radio transceivers serving mobile terminals operating in one of said inner and outer tiers switches to serving mobile terminals operating in the other one of said inner and outer tiers, re-determining a ratio of the number of radio transceivers assigned to said inner cell to the number of radio transceivers assigned to said cell;

re-determining the radius of said inner tier such that said ratio of the square of the radius of said inner tier to the square of the radius of said cell equals said of the number of radio transceivers assigned to said inner tier to the number of radio transceivers in said cell remains constant; and re-tiering said power tiered cell in accordance with said re-determined radius of said inner tier of said cell.

20. For a cellular telephone system having a power tiered cell which includes an inner tier and an outer tier, a method for servicing mobile terminals operating within said power tiered cell using a plurality of communication channels, said method comprising the steps of:

assigning each one of said plurality of communication channels to either said inner tier or said outer tier;

determining whether a first mobile terminal to be served is operating in said inner tier or said outer tier;

if said first mobile terminal is operating in said inner tier, providing service to said first mobile terminal over an available channel of said channels assigned to serve mobile terminals operating in said inner tier;

if said first mobile terminal is operating in said outer tier, providing service to said first mobile terminal over an available channel of said channels assigned to serve mobile terminals operating in outer tier;

detecting a switch of one of said channels assigned to serve mobile terminals operating in a first one of said inner and outer tiers to serving mobile terminals operating in the other one of said inner and outer tiers;

upon detecting said switch, re-sizing said inner tier such that a ratio of the area of said inner tier to the area of said cell matches a ratio of the number of channels serving mobile terminals operating in said inner tier to the number of channels serving mobile terminals operating in said cell;

determining whether a next mobile terminal to be served is operating in said inner tier or said outer tier;

if said next mobile terminal is operating in said inner tier, providing service to said next mobile terminal over a next available one of said channels assigned to serve mobile terminals operating in said inner tier; and if said next mobile terminal is operating in said outer tier, providing service to said next mobile terminal over a next available one of said channels assigned to serve mobile terminals operating in said outer tier;

wherein, by re-sizing said inner tier, said inner tier and said cell maintain a constant density of assigned channels per unit area.

21. The method of servicing terminals according to claim 20 wherein the step of determining whether a first mobile terminal to be served is operating in said inner tier or said outer tier further comprises the steps of:

determining a power level threshold value which defines an outer peripheral edge of said inner tier;

determining a power level for said first mobile terminal; and comparing said power level for said first mobile terminal to said power level threshold value to determine whether said first mobile terminal is operating in said inner tier or said outer tier.

22. The method of servicing terminals according to claim 21 wherein the step of re-sizing said inner tiers such that a ratio of the area of said inner tier to the area of said cell matches a ratio of the number of channels serving mobile terminals operating in said inner tier to the number of channels serving mobile terminals operating in said cell further comprises the step of:

adjusting said power level threshold value defining said outer peripheral edge of said inner tier such that said ratio of the area of said inner tier to the area of said cell matches said ratio of the number of channels serving mobile terminals operating in said inner tier to the number of channels serving mobile terminals operating in said cell.

23. The method of servicing terminals according to claim 22 wherein the step of determining whether a next mobile terminal to be served is operating in said inner tier or said outer tier further comprises the steps of:

determining a power level for said next mobile terminal; and comparing said power level for said next mobile terminal to said adjusted power level threshold value to determine whether said next mobile terminal is operating in said inner tier or said outer tier.

* * * * *